United States Patent Office 3,509,266
Patented Apr. 28, 1970

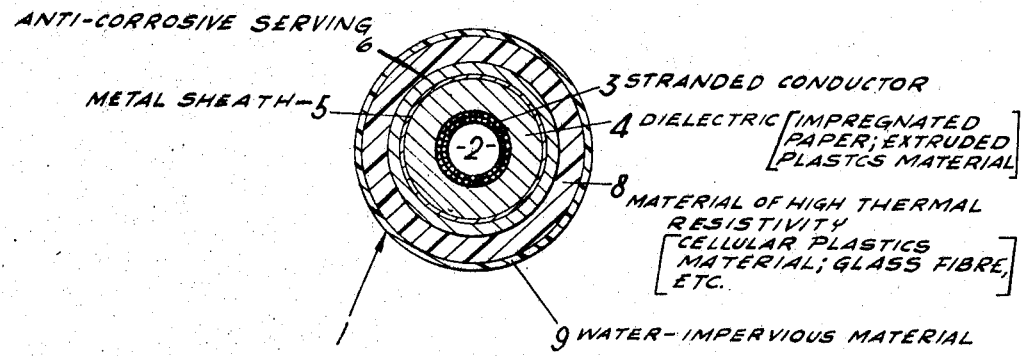
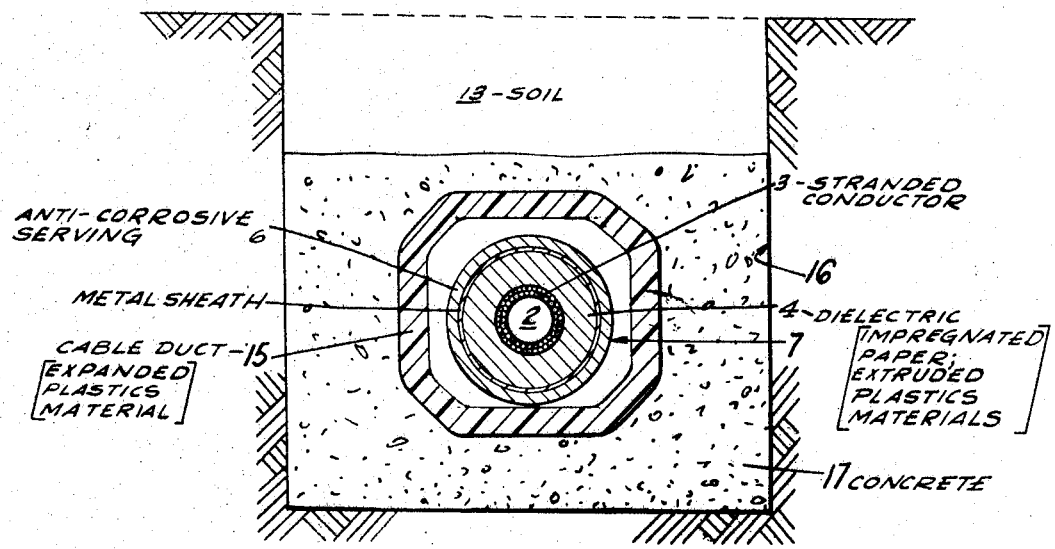

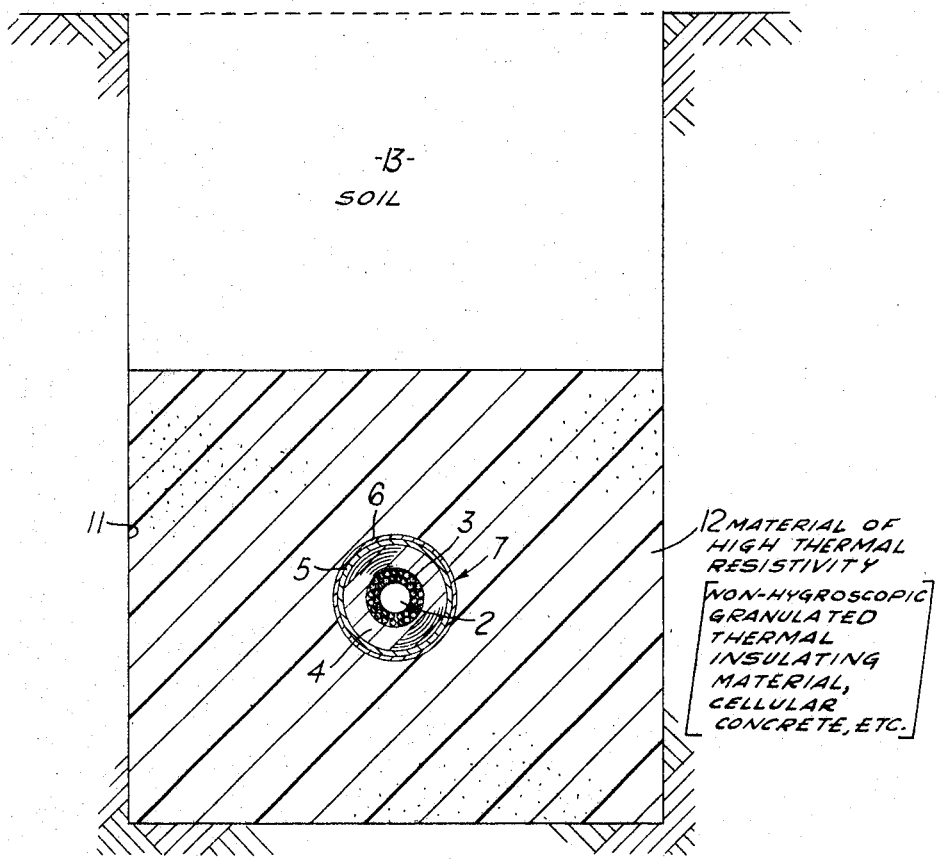
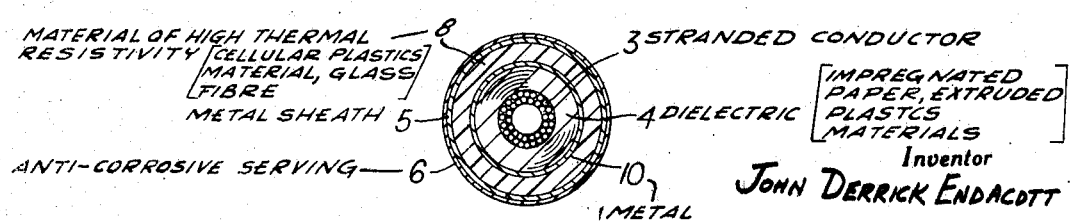

3,509,266
DIRECT CURRENT ELECTRIC CABLES
John Derrick Endacott, Sidcup, Kent, England, assignor to British Insulated Callender's Cables Limited, London, England
Filed Dec. 7, 1966, Ser. No. 599,873
Claims priority, application Great Britain, Dec. 10, 1965, 52,549/65
Int. Cl. H01b 7/34
U.S. Cl. 174—15                        16 Claims

ABSTRACT OF THE DISCLOSURE

A high voltage, high power direct-current electric cable installation comprises a conductor having at least one passage for the circulation of a non-cryogenic coolant for abstracting heat from the conductor, a wall of dielectric surrounding both the conductor and the passage, and means for artificially raising the thermal resistance between the conductor dielectric and its environment. The thermal insulating means is such that the difference between the initial stress distribution and the stress distribution on load is substantially less than in an otherwise equivalent direct-current electric cable installation of normal construction.

---

This invention relates to installations of insulated conductors for the transmission of high voltage direct-current and to such insulated conductors. Such conductors are to be found in single core and multicore high voltage direct-current power cables and in joints and terminations therefor. They may also be used in rigid conductor systems for high voltage direct-current power transmission. For the sake of brevity the term "cable" is used hereinafter wherever the context permits to designate such an insulated conductor, whether or not it is the insulated conductor of a single core cable or one of the insulated conductors of a multicore cable, the or an insulated conductor of a joint between two lengths of single or multicore cable or the or an insulated conductor of a termination of a single or multicore cable, or an insulated rigid conductor forming part of a bus-bar system for high voltage direct-current power transmission.

In such cables the stress distribution corresponds with and is determined by the distribution of the direct current resistance of the dielectric. Where the dielectric wall is of the same grade of material throughout, at any distance $r$ from the axis of the cable conductor the electric stress distribution $E$ will, if the dielectric is at the same temperature throughout, as will be the case when the cable is initially energised, be given by the formula:

$$E = \frac{V_0}{r \log_e \frac{r^1}{r^0}}$$

where $V_0$ is the voltage difference across the dielectric wall and $r^0$ and $r^1$ are respectively the radii of the internal and external surfaces of the wall. When the cable is put on load, heat is generated in the conductor. It is the practice for this heat to be dissipated by flow through the dielectric to the exterior of the cable and accordingly there is a temperature gradient across the dielectric wall and, as the resistivity of the cable insulants at present in use falls markedly as their temperature increases, there will be a change from the initial resistance gradient in the dielectric. This change in resistance gradient will result in a change from the initial electric stress gradient, lowering the electrical stress at the conductor/dielectric interface and raising the stress in the dielectric at its external surface. This change in resistivity distribution may be sufficiently large to bring about a reversal of the stress distribution and result in the stress at the outer surface of the dielectric exceeding that at the conductor/dielectric interface. Likewise, in the case of cables having a dielectric of which the resistivity is not initially uniform throughout, as will be the case where the dielectric wall is not of the same grade of material throughout, there will be a change in stress distribution as the cable heats up under its load current. This change may be greater than or less than that which occurs under similar circumstances in a cable having a dielectric of which the same grade of material is used throughout.

Such changes in stress distribution are disadvantageous in that they may impose a limitation on the design of the cable. This limitation becomes increasingly severe with increase in wall thickness of the dielectric and increase in heat generated in the conductor, inasmuch as these increases result in a greater temperature gradient across the dielectric, that is to say, in the case of cables for transmitting very large amounts of power at very high voltages, hereinafter referred to as "high voltage, high power" cables. An example of such a cable is an oil impregnated paper insulated cable, designated to transmit power of, say 1,000 megawatts at, say, 500 kilovolts.

It is an object of the present invention to overcome the aforesaid disadvantage to a substantial degree by providing a high voltage, high power, direct-current electric cable installation of a novel construction in which the difference between the initial stress distribution and the stress distribution on load is substantially less than in a comparable direct-current electric cable installation of normal construction.

In accordance with the invention a high voltage, high power direct-current electric cable installation comprises a conductor, a wall of dielectric surrounding both the conductor and a passage or passages for the circulation of a non-cryogenic coolant for abstracting heat from the conductor and means for artificially raising the thermal resistance between the dielectric and ground surface, whereby the difference between the initial stress distribution and the stress distribution on load is substantially less than in an otherwise equivalent direct-current electric cable installation of normal construction.

With normal cable installations the thermal resistance between dielectric and ground surface is about 100 thermal ohms. In order that the difference between the initial stress distribution and the stress distribution on load shall be substantially less than in an otherwise equivalent direct-current electric cable installation of normal construction it is preferred in the case of paper or plastics film insulated cables to raise artificially the thermal resistance between dielectric and ground surface to about 500 to 600 thermal ohms and in case of cable installations comprising cables having an extruded plastics dielectric to raise it to about 300 thermal ohms.

In the cable installation of the present invention the means for artificially raising the thermal resistance between the cable dielectric and ground surface may be a layer of material of high thermal resistivity surrounding the dielectric wall and constituting a component part of the cable and its joints and terminations. By "a material of high thermal resistivity" as used in this specification and in the claims which form part thereof is meant a material having a thermal resistivity substantially higher than that of any non-metallic material forming a covering layer on, or otherwise surrounding, an otherwise equivalent cable, joint or termination of conventional construction.

Accordingly the invention also comprises for use in the cable installation of the present invention a novel form of high voltage, high power, direct-current electric cable, and novel forms of cable joint and cable termination therefor, each having a wall of dielectric surrounding both the conductor of the cable joint or termination and a passage or passages for the circulation of a non-cryogenic coolant for abstracting heat from the conductor and, surrounding the dielectric wall of the cable, joint or termination, a layer of thermal insulation which has a thermal resistance substantially higher than that of any non-metallic covering layer on an otherwise equivalent cable, joint or termination of conventional construction.

Alternatively, the cable installation of the present invention may comprise a high voltage, high power direct-current electric cable of conventional construction which is laid in a trench and surrounded by back-fill of a material of high thermal resistivity, e.g. a non-hydroscopic granulated thermal insulating material such as the material sold under the trade name Manolith which is a by-product of the distillation of coal and has the property of being water repellent, or cellular concrete. In a further alternative cable installation of the present invention a high voltage, high power direct-current electric cable of conventional construction is drawn into or laid in a duct or channel made of a material of high thermal resistivity, e.g. expanded plastics material.

In some cases the thermal resistance between the cable dielectric and ground surface in a cable installation according to the present invention may be artificially raised by using the cable of the present invention and embedding it in a mass of material of high thermal resistivity or in ducts or channels of high thermal resistivity material.

The current rating of a high voltage, high power cable is determined by the maximum safe operating temperature of its conductor and by the thermal resistance of the cable and that of its environment in series. The maximum safe conductor operating temperature is the highest that is practicable without causing damage to the dielecric surrounding it. Where the latter is oil-impregnated paper this temperature is in the region of 85° C. In order to be able to secure the maximum benefit from such a cable as regards the amount of power transmissible it is the practice so to load the cable that it will be capable of operating for a prolonged period with its conductor running at the maximum safe operating temperature, with the result that when the cable is on load there will be a steep temperature gradient across the dielectric wall which is conducive to reversal of stress distribution. If one attempts to reduce the temperature gradient by reducing the conductor temperature by diminishing the ohmic heat generated in the conductor, the load carrying capacity of the cable is reduced. By using a cable installation constructed in accordance with the present invention the temperature gradient across the dielectric wall can be reduced without reducing the load carrying capacity of the cable, the conductor being held at or below its maximum safe temperature by abstraction of heat therefrom by flow of non-cryogenic coolant through one or more channels in the conductor and/or between the conductor and the dielectric.

Accordingly, the invention also comprises a method of transmitting power over a high voltage, high power, direct-current electric cable installation in which the thermal resistance between the conductor and the cable environment is artificially increased to reduce the temperature gradient across the cable dielectric by the interpolation of a layer of high thermal resistance and the temperature of the conductor is prevented from rising above its safe value by abstracting heat from it by flow of non-cryogenic coolant through one or more passages within the conductor and/or between it and the conductor dielectric.

It will be seen that by means of the present invention the possibility exists of maintaining under load conditions a substantially zero temperature gradient across the dielectric wall and hence of maintaining at full load the initial or no-load stress distribution.

The invention will now be more fully described, by way of example, with reference to the accompanying drawings, in which:

FIGURE 1 is a cross-sectional view of a preferred construction of electric cable for the transmission of high voltage, high power direct-current, FIGURES 2 and 3 are cross-sectional views of two alternative constructions of high voltage, high power direct-current electric cable installation, and FIGURE 4 is a cross sectional view of an alternative construction of electric cable in accordance with the invention.

The electric cable 1 shown in FIGURE 1 comprises a hollow stranded conductor 3 defining a central passage 2 for the circulation of a non-cryogenic coolant, such as insulating oil. A dielectric wall 4 built up of helically wound layers of impregnated paper tapes surrounds the hollow conductor 3 and the insulated conductor so formed is enclosed by a metal sheath 5. An anti-corrosive serving 6 of a normal form is applied to the outer surface of the metal sheath 5. Surrounding the anti-corrosive serving 6 is a layer 8 of a material of high thermal resistivity as hereinbefore defined and an outer covering 9 of water-impervious material. A similar layer of material of high thermal resistivity and an outer water-imprevious covering would be applied to the housings of the cable joints and terminations.

Under operating conditions the cable 1 is cooled by forced circulation of a non-cryogenic coolant, e.g. insulating oil through the passage 2 and through a heat exchanger and return pipe located outside the cable, the oil also permeating through the interstices between the conductor strands and serving to impregnate the paper insulation.

It will be apparent that except for the provision of the layer 8 of thermal insulation outside the anti-corrosive serving 6 and for the provision of a larger central passage 2 in the conductor 3, the construction of cable 1 is similar to that of a conventional oil-filled cable.

In an alternative construction the layer of thermal insulation outside the cable dielectric and forming a component part of the cable may lie beneath the cable sheath or, where applicable, beneath the joint or terminal housing.

Instead of cooling the cable by forced circulation of insulating oil an impermeable layer (not shown), e.g. a sheath of lead or of conductive polyethylene, may be provided between the conductor 3 and its dielectric 4 and water may be used as the circulating non-cryogenic coolant.

Instead of, or in addition to, having a hollow bore the external surface of the conductor may have helically or longitudinally extending grooves for the passage of non-cryogenic coolant. Where the non-cryogenic coolant is water or some other fluid incompatible with the dielectric impregnant, the channelled conductor will be separated from its dielectric by a water-impervious barrier.

The radial thickness of the layer of thermal insulating material will, of course, depend to a large extent on its thermal resistivity, on the thickness of the cable dielectric and on the current rating. A seamless sheath of a cellular polyvinyl chloride composition or other cellular plastics material may be used as the layer of thermal insulating material or the thermal insulating material glass fibre may be used and may be applied to the cable in the form of a tape of non-woven fabric reinforced in the direction of its length by a backing of woven glass fibre or by threads of nylon or other non-conductive filar material of high tensile strength.

One construction of high voltage, high power direct-current electric cable installation in accordance with the present invention is illustrated in FIGURE 2 and comprises a cable 7 of conventional construction except that it has a large bore central passage for the circulation of non-cryogenic coolant laid in a trench 11 and surrounded by a back-fill 12 of a material of high thermal resistivity, for example a non-hygroscopic granulated thermal insulating material. The remainder of the trench not containing the back-fill 12 is filled with soil 13.

FIGURE 3 shows an alternative form of cable installation in which a cable 7 of conventional construction apart from a central passage of large bore for circulation of non-cryogenic coolant is located in a cable duct 15 made of a material of high thermal resistivity, such as expanded plastics material, which is laid in a trench 16 and embedded in concrete 17. The remainder of the trench 16 not containing the concrete 17 is filled with soil 13.

In each of the cable installations shown in FIGURES 2 and 3 the cable 7 may be replaced by the preferred form of cable 1 illustrated in FIGURE 1.

The alternative form of cable shown in FIGURE 4 comprises a hollow stranded conductor 3 defining a central oil passage 2, a dielectric wall 4 and, surrounding the dielectric wall, a covering 10 of metal. Surrounding the cover 10 is a layer 8 of a material of high thermal resistivity as hereinbefore defined and this layer is enclosed by a metal sheath 5. An anti-corrosive serving 6 of a normal form is applied to the outer surface of the metal sheath 5.

With the improved form of high voltage, high power direct-current electric cable installation of the present invention the possibility exists by careful appropriate selection of wall thickness and quality of the material of high thermal resistivity built into the cable or otherwise surrounding it, of obtaining such a temperature gradient across the dielectric that the stress in the dielectric is substantially constant throughout. In this way the dielectric can be operated at a higher stress so that its wall thickness can be reduced thus reducing the cost of the cable.

What I claim as my invention is:

1. A high voltage, high power direct-current electric cable installation comprising a conductor having at least one passage for the circulation of a non-cryogenic coolant for abstracting heat from the conductor, a wall of dielectric surrounding both the conductor and said passage, and means for artificially raising the thermal resistance between the conductor dielectric and its environment, whereby the difference between the initial stress distribution and the stress distribution on load is substantially less than in an otherwise equivalent direct-current electric cable installation of normal construction.

2. An electric cable installation as claimed in claim 1, wherein the dielectric wall is of a paper and the thermal resistance between the conductor dielectric and its environment lies within the range 500 to 600 thermal ohms.

3. An electric cable installation as claimed in claim 1, wherein the dielectric wall is of extruded plastics material and the thermal resistance between the conductor dielectric and its environment is about 300 thermal ohms.

4. A high voltage, high power direct-current electric cable installation as claimed in claim 1 wherein a cable, which includes a conductor having at least one passage for the circulation of a non-cryogenic coolant for abstracting heat from the conductor and a wall of dielectric surrounding both the conductor and said passage, is laid in a trench and surrounded by back-fill of a material which has a thermal resistivity substantially higher than that of any non-metallic material surrounding an otherwise equivalent cable of conventional construction and which artificially raises the thermal resistance between the cable and its environment, whereby the difference between the initial stress distribution and the stress distribution on load is substantially less than in an otherwise equivalent direct-current electric cable installation of normal construction.

5. An electric cable installation as claimed in claim 4, wherein the back-fill is a non-hygroscopic granulated thermal insulating material.

6. An electric cable installation as claimed in claim 4, wherein the back-fill is cellular concrete.

7. An electric cable suitable for use in a high voltage, high power direct-current electric cable installation, as claimed in claim 1, which cable comprises a conductor having at least one passage for the circulation of a non-cryogenic coolant for abstracting heat from the conductor, a wall of dielectric surrounding both the conductor and said passage, a layer of thermal insulation which surrounds the dielectric wall and constitutes a component part of the cable and the means for artificially raising the thermal resistance between the conductor dielectric and its environment and, surrounding the layer of thermal insulation, a sheath of moisture-impervious material, the layer of thermal insulation having a thermal resistance substantially higher than that of any non-metallic covering layer on an otherwise equivalent cable of conventional construction.

8. An electric cable suitable for use in a high voltage, high power direct-current electric cable installation, as claimed in claim 1, which cable comprises a conductor having at least one passage for the circulation of a non-cryogenic coolant for abstracting heat from the conductor, a wall of dielectric surrounding both the conductor and said passage, a sheath of moisture-impervious material surrounding the dielectric wall and, outside the sheath and constituting a component part of the cable, a layer of thermal insulation which constitutes the means for artificially raising the thermal resistance between the conductor dielectric and its environment and which has a thermal resistance substantially higher than that of any non-metallic covering layer on an otherwise equivalent cable of conventional construction.

9. An electric cable as claimed in claim 8, wherein the layer of thermal insulation is of a material of high thermal resistivity.

10. An electric cable as claimed in claim 8, wherein the layer of thermal insulation comprises a seamless sheath of cellular plastics material.

11. An electric cable as claimed in claim 8, wherein the layer of thermal insulation is made of glass fibre.

12. A high voltage, high power direct-current electric cable installation comprising an electric cable as claimed in claim 8, wherein the cable conductor is a hollow stranded conductor, the dielectric wall is of oil-impregnated material and a non-cryogenic coolant, comprising an insulating oil, circulates along the hollow conductor, permeates through the interstices between the conductor strands and serves to impregnate the dielectric.

13. A high voltage, high power direct-current electric cable installation comprising an electric cable as claimed in claim 8, wherein the cable conductor is a hollow conductor, an impermeable layer is provided between the conductor and the dielectric wall and a non-cryogenic coolant comprising water circulates along the hollow conductor.

14. A high voltage, high power direct-current electric cable installation comprising a cable including a conductor having at least one passage for the circulation of a non-cryogenic coolant for abstracting heat from the conductor and a wall of dielectric surrounding both the conductor and said passage, wherein the cable is housed in a duct made of a material which has a thermal resistivity substantially higher than that of any non-metallic material surrounding an otherwise equivalent cable of conventional construction and which artificially raises the thermal resistance between the cable and its environment, whereby the difference between the initial stress distribution and the stress distribution on load is substantially less than in an otherwise equivalent direct-current electric cable installation of normal construction.

15. An electric cable installation as claimed in claim 14, wherein the duct is made of expanded plastics material.

16. An electric cable installation as claimed in claim 14, wherein the dielectric wall of the cable is surrounded by a layer of material which has a thermal resistivity substantially higher than that of any non-metallic material surrounding an otherwise equivalent cable of conventional construction and which constitutes a component part of the cable.

References Cited

UNITED STATES PATENTS

| | | | |
|---|---|---|---|
| 2,972,968 | 2/1961 | Stafford | 138—105 X |
| 2,997,071 | 8/1961 | May | 138—105 |
| 3,007,203 | 11/1961 | Ammons | 18—48 |
| 3,084,208 | 4/1963 | Palandri et al. | 174—24 |
| 3,143,591 | 8/1964 | Flamand | 174—19 X |
| 3,202,754 | 8/1965 | Ruch | 174—37 X |
| 3,248,473 | 4/1966 | Buhmann | 174—107 |
| 3,313,321 | 4/1967 | Keller | 138—105 |
| 3,265,808 | 8/1966 | Binch | 174—121 X |
| 3,409,731 | 11/1968 | Fink et al. | 174—15 |
| 3,396,551 | 8/1968 | Dimentberg | 174—15 |
| 2,197,639 | 4/1940 | Hobart | 174—14 |

FOREIGN PATENTS

| | | |
|---|---|---|
| 257,528 | 3/1964 | Australia. |
| 887,029 | 1/1962 | Great Britain. |

OTHER REFERENCES

"Fiberglass," Catalog No. EL44-7, pp. 4, 5, 13 and 20.

LEWIS H. MYERS, Primary Examiner

A. T. GRIMLEY, Assistant Examiner

U.S. Cl. X.R.

138—105; 174—25, 37, 68, 102, 107